United States Patent [19]
Morales

[11] Patent Number: 4,609,467
[45] Date of Patent: Sep. 2, 1986

[54] ROTARY PLOW ASSEMBLY
[75] Inventor: Ramon A. Morales, Budd Lake, N.J.
[73] Assignee: Komline-Sanderson Engineering Corporation, Peapack, N.J.
[21] Appl. No.: 763,278
[22] Filed: Aug. 7, 1985
[51] Int. Cl.⁴ ............................................. B01D 33/36
[52] U.S. Cl. .................................... 210/396; 210/400; 209/267; 209/272; 209/307; 209/385
[58] Field of Search ............... 210/386, 396, 400, 401, 210/456, 783; 209/267, 272, 264, 385, 307, 308

[56] References Cited
U.S. PATENT DOCUMENTS

| 1,207,262 | 12/1916 | Alwart | 209/267 |
| 1,432,738 | 10/1922 | Alwart | 209/267 |
| 1,457,810 | 6/1923 | Alwart | 209/267 |
| 3,420,239 | 1/1969 | Lorenzen | 209/308 |
| 3,984,329 | 10/1976 | Wenzel et al. | 210/396 |
| 4,354,935 | 10/1982 | Austin et al. | 210/396 |
| 4,367,601 | 1/1983 | Latimer et al. | 209/267 |
| 4,456,530 | 6/1984 | Eustacchio et al. | 210/396 |

FOREIGN PATENT DOCUMENTS 1598130  9/1981  United Kingdom ................ 210/396

Primary Examiner—Benoit Castel
Attorney, Agent, or Firm—Watson, Cole, Grindle & Watson

[57] ABSTRACT

Disclosed is a plow assembly adapted for use with an endless conveyor type filtering device. The assembly comprises an elongated support member and at least one plow depending therefrom. The plow comprises a shaft affixed to the support member, a plow body having a central bore through which the shaft partially extends, the body being capable of rotary movement on the shaft, and a stop retaining the plow body on the shaft.

20 Claims, 3 Drawing Figures

ROTARY PLOW ASSEMBLY

BACKGROUND OF THE INVENTION

The present invention relates generally to plow assemblies adapted to ride on the surface of a conveyor belt and, more particularly, to such plow assemblies which include a plow which is capable of rotation about a vertical axis and preferably is capable of vertical movement relative to the belt.

While the present invention will be discussed hereinafter with reference to its use in conjunction with a conveyor type filtering device used for dewatering of sludge, it should be recognized that its use and applicability are not thereby so limited.

Belt-type filtering devices used for the dewatering of sludge generally comprise an endless, liquid permeable conveyor belt supported in a generally horizontal position by a perforate guide table. Sludge is deposited on the horizontal belt at one end of the device and as the belt travels along the guide table, water continually passes through the perforate belt to yield a dewatered sludge at the other end of the device.

It has been found that dewatering in such a device is facilitated if one or more so-called "plows" are arranged above the belt to extend into the moving sludge and contact the upper surface of the belt. Such plows tend to evenly distribute the sludge over the surface of the belt, help prevent the formation of solid material layers, and also tend to keep the perforations in the belt open by scraping over or wiping the top surface of the belt.

To prevent an accumulation of solid matter on the plows, it has been one practice to have the plows pivotally mounted on the filtering device such that the plows pivot upwardly out of the sludge upon such accumulation. While such an arrangement may be satisfactory for some purposes, the amount of scraping and wiping action by the plows is dependent upon the interrelationship among the weight of the plow, the density of the sludge and the speed of the belt. Thus, for a given plow, the wiping or scraping action may vary considerably as the operating conditions of the device change.

SUMMARY OF THE INVENTION

It is therefore a feature of the present invention to provide a plow assembly which is adapted to provide adequate wiping or scraping action over a fairly wide range of operating conditions for the device.

It is another feature of the present invention to provide a plow assembly where the plow is capable of rotating about a vertical axis so as to allow stringy or rag like objects contained in the sludge to pass around the plow.

It is a further feature of the invention to provide a plow assembly wherein the plow is capable of rising vertically so as to allow the plow to pass over and free a large accumulation of solid matter on the plows in the sludge.

Briefly, in its broader aspects, the present invention comprehends a plow assembly adapted for use with an endless conveyor type filtering device, the assembly comprising an elongated support member and at least one plow depending therefrom, the plow comprising a shaft affixed transverse to the support member, a plow body having a central bore through which the shaft partially extends, the plow body being capable of rotary movement on the shaft, and means for retaining the plow body on the shaft. The invention also comprehends an endless conveyor type filtering device including such a plow assembly.

Further objects, advantages and features of the present invention will become more fully apparent from a detailed consideration of the arrangement and construction of the constituent parts as set forth in the following description taken together with the accompanying drawing.

DESCRIPTION OF THE PREFERRED EMBODIMENTS

Figure 1:
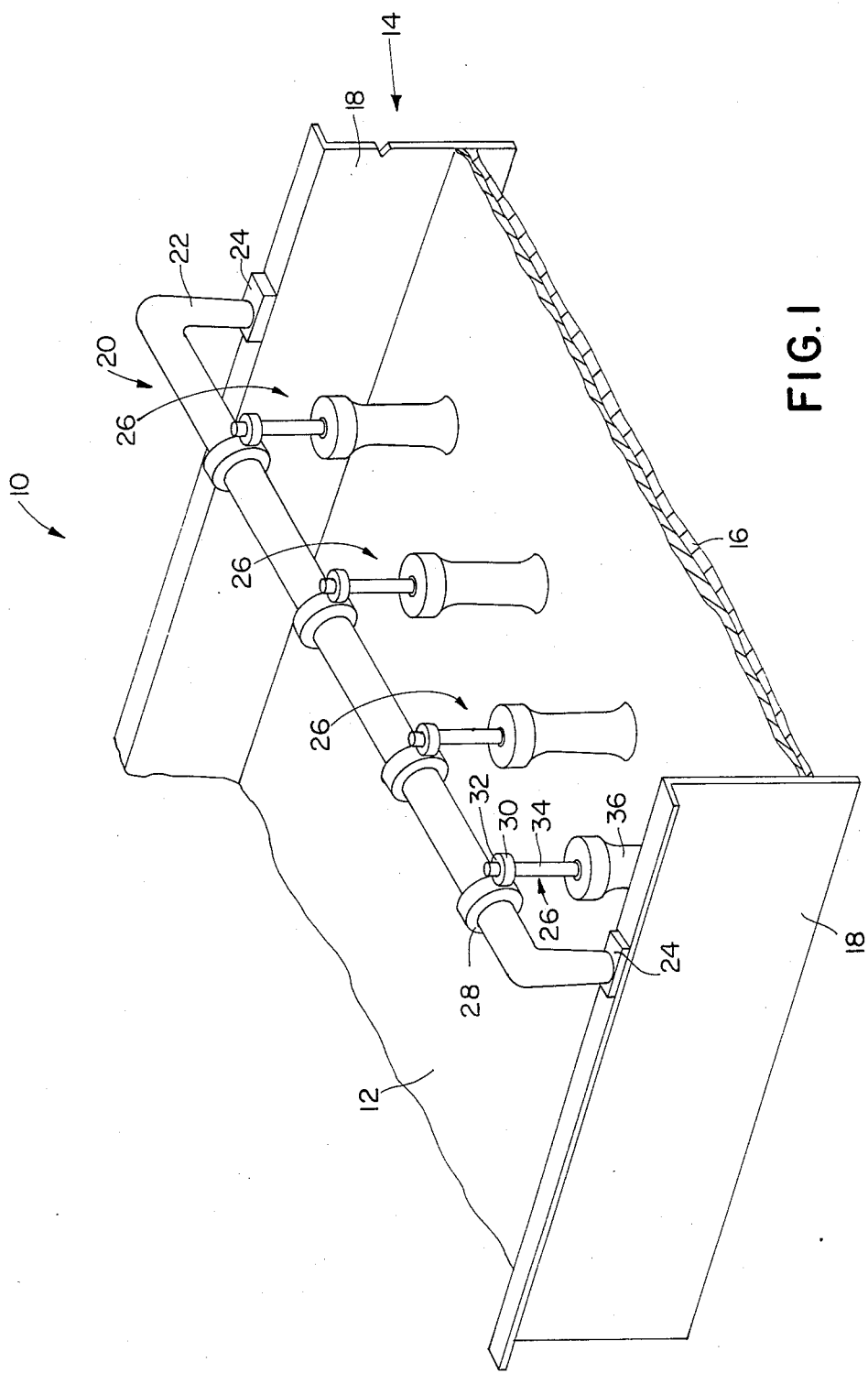
FIG. 1 is a perspective view of a plow assembly according to the present invention, the assembly being mounted on a conventional conveyor type filtering device, only a portion of which is illustrated.

Turning now to FIG. 1, shown is a portion of conventional conveyor type filtering device 10 which comprises endless, perforate conveyor belt 12 which is adapted to carry a liquid containing material such as sludge and allow the liquid to drain through the belt. Conveyor belt 12 is supported by guide table 14 comprising liquid permeable bottom 16 and parallel upstanding side walls 18.

Mounted on side walls 18 of guide 14 is plow assembly generally designated as 20. Assembly 20 comprises U-shaped support member 22 extending generally transverse to the direction of movement of belt 12 and from one side wall 18 to the other side wall. The ends of support member 22 are securely affixed to the upper portions of side walls 18 of guide table 14 by means of brackets 24. Spaced along and depending from support member 22 are a plurality of plows 26. Although four plows 26 are shown, the number of plows attached to a particular support member 22 may vary considerably, generally the number depending upon, among other things, the size of filtering device 10, the size of the plows, and the degree of disruption desired.

Figure 2:
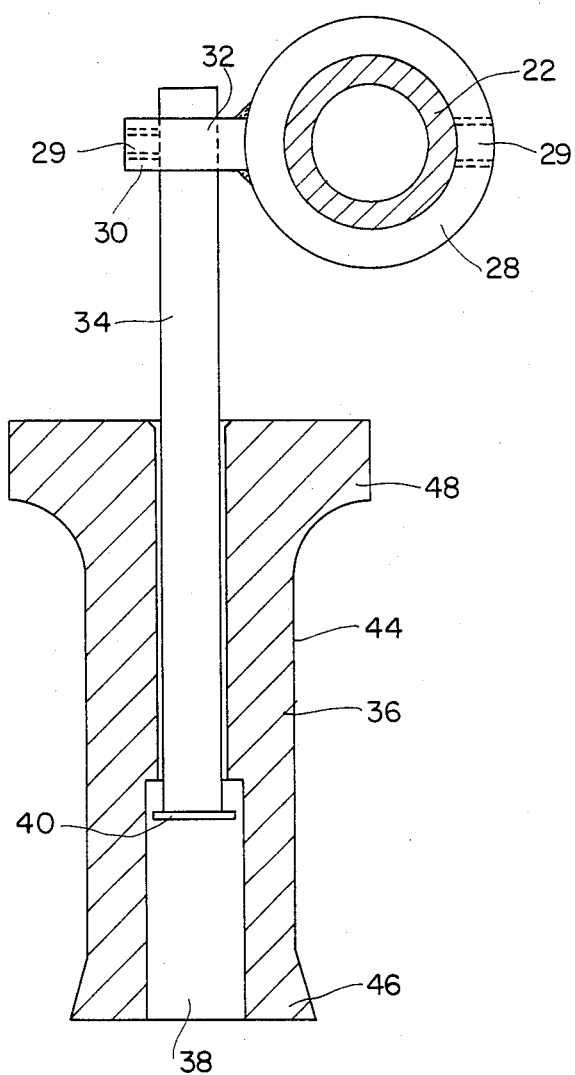
FIG. 2 is a partial cross-sectional view of a plow as shown in FIG. 1.

In this embodiment of the invention, plows 26 are secured to support member 22 by collar 28 extending about the support member and affixed thereto by, for example, a set screw 29 as is best shown in FIG. 2. Collar 28 includes horizontally extending ear 30 having aperture 32 therein. Shaft 34 of plow 26 extends through aperture 32 of ear 30 and is secured to the ear by another set screw 29. Plow body 36 depends from shaft 34 and is adapted to contact conveyor belt 12 where, in operation of device 10, the plow body tends to disrupt the flow liquid-containing material (not shown) carried by the belt and provides some scraping or wiping function to help maintain belt permeability.

As is often the case in filtering liquid-containing material such as sludge, the material may contain debris such as rags and the like which, upon contact with plows 26, can cause undesirable backup of the material being filtered. To enable plow body 36 to ride up and over such accumulations, plow body 36 is slidably carried on shaft 34 as is illustrated in FIG. 2. Plow body 36 is provided with a central bore 38 of two different diameters, the upper portion of the bore being of a slightly larger diameter than shaft 34 and the lower portion being slightly larger than head 40 at the lower end of the shaft. As is apparent, the transition between the two diameters of bore 38 provide a stop which coacts with head 40 to limit the downward travel of plow body 36 on shaft 34.

An important feature of this present invention is the exterior shape of plow body 36. As is apparent from FIGS. 1 and 2, plow body 36 has a central cylindrical portion 44, a lower outwardly flared skirt portion 46 and an upper portion 48 which is enlarged relative to the central portion and the lower skirt portion. With such a shape, the force of material carried by belt 12 impinging on flared skirt portion 46 tends to act downwardly thus urging plow body downwardly in contact with the belt. In addition, as the depth of material carried by belt 12 reaches the upper portion 48 of plow body 36, a lifting action will be produced as a result of the upward force of the upper portion overcoming the downward force acting on the smaller surface areas of flared skirt portion 46. Such an increase in depth of the material carried by belt 12 may be caused, for example, by a large solid matter buildup in the material striking one or more plows 26 and thus damming the flow of material or by any other occurrence which could be cause for increase in the depth of material carried by the belt. By having the increased depth of material lift the plow body 36, the buildup will be allowed to pass. When the depth of material is reduced below the level of upper portion 48 of plow body 36, the downward action caused by lower skirt portion 46 will cause the plow body to reseat itself on belt 12.

Another important feature of the subject invention is that plow body 36 is capable of rotating on shaft 34. Thus, if a fibrous material such as a rag, string or the like contained in the liquid containing solid material carried by belt 12 should contact plow body 36, the fibrous material will not be permanently caught or wrapped about the plow body since the asymmetric forces applied will cause the plow body to rotate and thus free the fibrous material.

Figure 3:
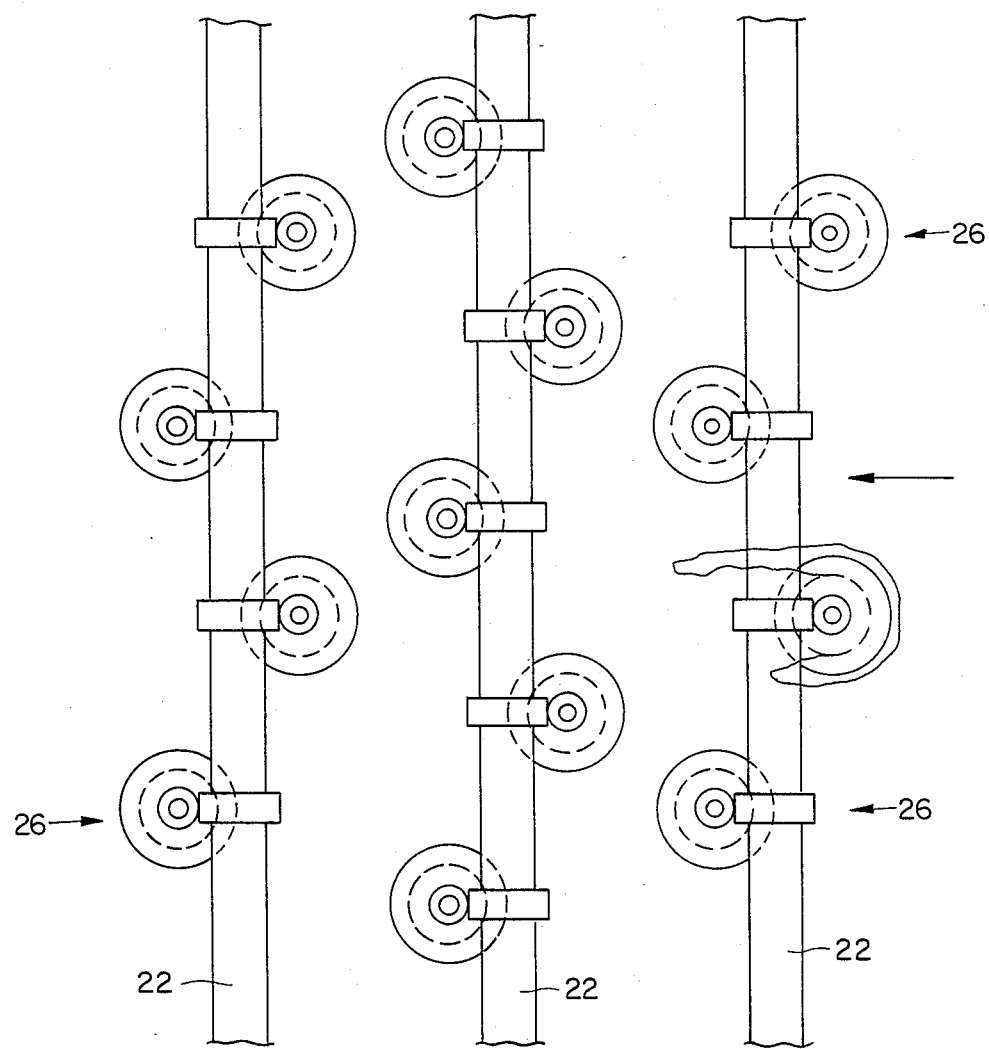
FIG. 3 is a top plan view of an alternative arrangement for the plow assembly of the invention.

FIG. 3 is a top plan view of alternate arrangement for securing plows 26 on support members 22. In this arrangement, plows 26 are staggered alternately on either side of support member 22. An advantage of this arrangement is that solid matter accumulation or rag hangup will be less likely to happen because of the longer span between plows on the same side of the support. Further, by increasing the distance between plows in a direction crosswise to the belt reduces the likelihood of the plows supporting a dam-like accumulation of solid material.

In a particularly preferred embodiment of the invention, the plow assembly is incorporated into an arrangement of the type disclosed in copending patent application Ser. No. 749,450 filed June 27, 1985 to John Goron, entitled "Raisable Plow Assembly," assigned to the same assignee as the subject application, which relates to means for raising an entire row of plows to facilitate, among other things, cleaning of the plows.

While there has been shown and described what is considered to be preferred embodiments of the present invention, it will be obvious to those skilled in the art that various changes and modifications may be made therein without departing from the invention as defined in the appended claims.

It is claimed:

1. A plow assembly adapted for use with an endless conveyor type filtering device, said assembly comprising an elongated support member and at least one plow depending therefrom, said plow comprising a shaft affixed to said support member, a plow body having a central bore through which the shaft at least partially extends, said body capable of rotary movement on said shaft, and means for retaining said plow body on said shaft.

2. A plow assembly in accordance with claim 1, wherein the bore of the plow body is of two portions having different diameters.

3. A plow assembly in accordance with claim 2, wherein the means for retaining the body on the shaft comprises a head on the shaft which engages the transition between the two bore portions in the plow body.

4. A plow assembly in accordance with claim 2, wherein the plow body is capable of sliding axially on the shaft.

5. A plow assembly in accordance with claim 4, wherein the plow body includes a generally cylindrical central portion coaxial with the bore and a lower flared skirt portion, the end of which has a larger diameter than said central portion.

6. A plow assembly in accordance with claim 5, wherein the plow body includes an upper enlarged portion which has a diameter greater than the end of the flared skirt portion.

7. A plow assembly in accordance with claim 1, wherein the plow body is capable of sliding axially on the shaft.

8. A plow assembly in accordance with claim 7, wherein the plow body includes a generally cylindrical central portion coaxial with the bore and a lower flared skirt portion, the end of which has a larger diameter than said central portion.

9. A plow assembly in accordance with claim 8, wherein the plow body includes an upper enlarged portion which has a diameter greater than the end of the flared skirt portion.

10. A plow assembly in accordance with claim 1, which includes at least two plows, the plows being mounted on opposite sides of said support member.

11. A conveyor-type filtering device comprising an endless, perforated conveyor belt, a rigid perforated guide table supporting at least a portion of the conveyor belt, and a plow assembly comprising an elongated support member and at least one plow depending therefrom, said plow comprising a shaft affixed to said support member, a plow body having a central bore through which the shaft partially extends, said body capable of rotary movement of said shaft, and means for retaining said plow body on said shaft.

12. A filtering device in accordance with claim 11, wherein the bore of the plow body is of two portions having different diameters.

13. A filtering device in acordance with claim 12, wherein the plow body is capable of sliding axially on the shaft.

14. A filtering device in accordance with claim 13, wherein the plow body includes a generally cylindrical central portion coaxial with the bore and a lower flared skirt portion, the end of which has a larger diameter than said central portion.

15. A filtering device in accordance with claim 14, wherein the plow body includes an upper enlarged portion which has a diameter greater than the end of the flared skirt portion.

16. A filtering device in accordance with claim 12, wherein the means for retaining the body of the shaft comprises a head on the shaft which engages the transition between the two bore portions in the plow body.

17. A filtering device in accordance with claim 11, wherein the plow body is capable of sliding axially on the shaft.

18. A filtering device in accordance with claim 17, wherein the plow body includes a generally cylindrical central portion coaxial with the bore and a lower flared skirt portion, the end of which has a larger diameter than said central portion.

19. A filtering device in accordance with claim 18, wherein the plow body includes an upper enlarged portion which has a diameter greater than the end of the flared skirt portion.

20. A filtering device in accordance with claim 11, which includes at least two plows, the plows being mounted on opposite sides of said support member.

* * * * *